United States Patent Office 3,197,503
Patented July 27, 1965

3,197,503
N-(ARYL)OXAMIC ACID CHLORIDES
Lowell R. Smith, St. Louis, and Angelo John Speziale, Creve Coeur, Mo., assignors to Monsanto Company, a corporation of Delaware
No Drawing. Filed Dec. 14, 1962, Ser. No. 244,583
7 Claims. (Cl. 260—544)

This invention relates to new and useful compounds and to the synthesis thereof.

The novel compounds are termed for convenience (I) N-(aryl)oxamic acid chlorides,
(II) N-(aryl)oxamates, and
(III) 3-(aryl)oxazolidine-4,5-diones and the synthesis thereof can be set forth schematically as follows:

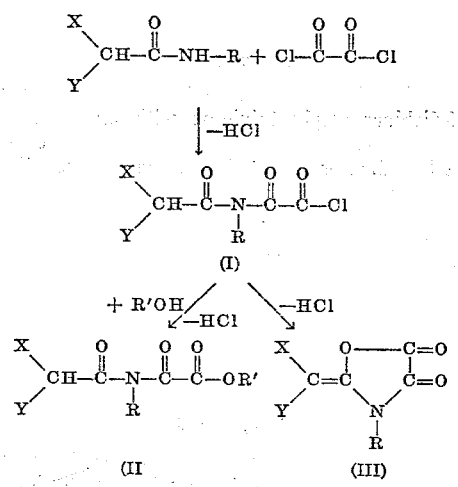

where in Y is hydrogen, halogen of atomc weight in the range of 18 to 80 (i.e., fluorine, chlorine or bromine), or lower alkyl (i.e., methyl, ethyl, propyl, butyl, amyl, and the various isomeric forms thereof having up to 5 carbon atoms), wherein X is halogen of atomic weight in the range of 35 to 80 (i.e., chlorine or bromine), wherein R is an aromatic hydrocarbon radical of the benzene series having from 6 to 10 carbon atoms (e.g., phenyl, tolyl, xylyl, ethylphenyl, propylphenyl, butylphenyl, and the various isomeric forms thereof) and said aromatic hydrocarbon radicals having one or more substituents on the aromatic nucleus thereof such as bromine, chlorine, nitro, methoxy, ethoxy, and mixtures thereof (e.g., bromophenyl, dibromophenyl, tribromophenyl, chlorophenyl, dichlorophenyl, trichlorophenyl, chlorobromophenyl, nitrophenyl, chloronitrophenyl, methoxyphenyl, dimethoxyphenyl, ethoxyphenyl, diethoxyphenyl, ar-chlorotolyl, ar-dichlorotolyl, ar-nitrotolyl, ar-bromotolyl, ar-methoxytolyl, ar-chloroanisyl, ar-bromophenetyl, and the various ar-substituted isomeric and homologous forms thereof), and wherein R' has from 1 to 5 carbon atoms and is alkyl, alkenyl, chloroalkyl, chloroalkenyl or alkoxyalkyl (e.g., methyl, ethyl, propyl, butyl, amyl, allyl, butenyl, pentenyl, chloroethyl, dichloroethyl, chloropropyl, dichorobutyl, chloroallyl, dichloroallyl, chlorobutenyl, dichlorobutenyl, methoxyethyl, ethoxyethyl, ethoxypropyl, etc., and the various isomeric ond homologous forms thereof).

The N-(aryl)oxamic acid chlorides (I) are prepared by reacting to evolve one molecular proportion of hydrogen chloride substantially equimolecular proportions of oxalyl chloride and an amide of the formula

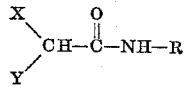

wherein X, Y and R have the aforedescribed significance in the presence of an inert organic solvent. Ordinarily this reaction will be conducted in the range of about 50° C. to about 75° C., however higher or lower temperatures can be employed depending upon the nature of the amide reactant. Operable amide reactants include α-chloroacetanilide, α-bromoacetanilide, α,α-dichloroacetanililde, α-chloro-α-bromoacetanilide, α,α-dibromoacetanilide, α-chloro-α-fluoroacetanilide, α-chloropropionanilide, α-chloro-n-butyranilide, N-chloroacetyl-p-toluidine, N-dichloroacetyl-p-toluidine, N-α-chloropropionyl-m-toluidine, N-bromoacetyl-3,5-xylidine, N-chloroacetyl-p-anisidine, N-chloroacetyl-p-phenetidine, N-bromoacetyl-p-t-butylaniline, N-chloroacetyl-4-chloroaniline, N-chloroacetyl-3,4-dichloroaniline, N-chloroacetyl-2,4,5-trichloroaniline, N-dichloroacetyl-3,4-dichloroaniline, N-dichloroacetyl-4-chloro-m-toluidine, N-chloroacetyl-4-bromoaniline, N-chloroacetyl-4-bromo-o-toluidine, N-dichloroacetyl-4-nitroaniline, N-dichloroacetyl-4-nitro-m-toluidine, N-chloroacetyl-3-chloro-4-nitroaniline, etc. For purposes of this invention it is preferred that in the amide reactants of the foregoing formula that X be chlorine and that R be an aromatic hydrocarbon radical of the benzene series having from 6 to 10 carbon atoms or said aromatic hydrocarbon radicals having from 1 to 3 chlorine substituents on the aromatic nucleus thereof.

As illustrative of the preparation of the N-(aryl)-oxamic acid chlorides but not limitative thereof is the following:

Example I

To a suitable reaction vessel equipped with a thermometer and agitator is charged 34.3 parts by weight of α-chloroacetanilide, 28.8 parts by weight of oxalyl chloride and about 320 parts by weight of carbon tetrachloride. While agitating the so charged mass is heated at about 60° C. for twenty-four hours. Thereupon the reaction mass is cooled and evaporated under vacuum at 10–25° C. to a semi-solid residue. The residue is dissolved in methylene chloride, treated with charcoal and then filtered. Upon addition of hexane to the filtrate a yellowish solid precipitates. This solid is filtered off and recrystallized from a methylene chloride-hexane mixture to give 33.2 parts by weight of white crystalline N-(chloroacetyl) oxanilic acid chloride

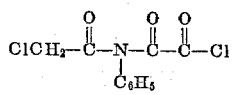

which melts at 107–109° C.

Example II

Employing the procedure of Example I but replacing α-chloroacetanilide with an equimolecular amount of α,α-dichloroacetanilide there is obtained N-(dichloroacetyl)oxanilic acid chloride

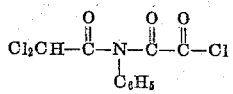

Example III

Employing the procedure of Example I but replacing α-chloroacetanilide with an equimolecular amount of N-chloroacetyl-4-chloronaniline there is obtained N-chloroacetyl-N-(4-chlorophenyl)oxamic acid chloride.

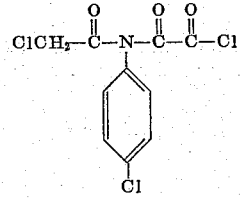

Example IV

Employing the procedure of Example I but replacing α-chloroacetanilide with an equimolecular amount of N-bromoacetyl-p-anisidine there is obtained N-bromoacetyl-N-(p-anisyl)oxamic acid chloride

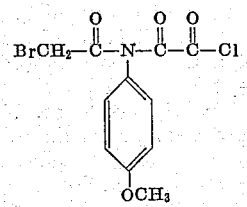

Example V

Employing the procedure of Example I but replacing α-chloroacetanilide with an equimolecular amount of N-chloroacetyl-4-nitro-m-toluidine there is obtained N-chloroacetyl-N-(4-nitro-m-tolyl)oxamic acid chloride

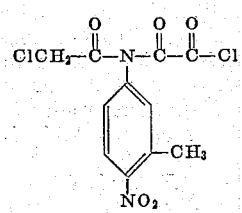

Example VI

Employing the procedure of Example I but replacing α-chloroacetanilide with an equimolecular amount of N-chloroacetyl-3-chloro-4-nitroaniline there is obtained N-chloroacetyl - N - (3 - chloro-4-nitrophenyl)oxamic acid chloride

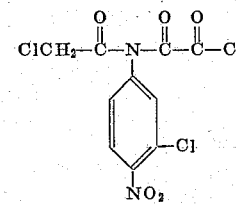

Example VII

To a suitable reaction vessel equipped with a thermometer and agitator is charged 15.93 parts by weight of N-dichloroacetyl-p-toluidine and about 60 parts by weight of benzene and the mass heated to about 60° C. While agitating this mass and maintaining the temperature at about 60° C. there is added dropwise 11.5 parts by weight of oxalyl chloride. Upon completion of the oxalyl chloride addition the mass is heated at about 60° C. for twenty-four hours. Thereupon the mass is subjected to vacuum distillation at 10–25° C. and 25–35 mm. to remove the benzene and unreacted oxalyl chloride. The residue is then recrystallized from a methylene chloride-hexane mixture to give white crystalline N-dichloroacetyl-N-(p-tolyl)oxamic acid chloride

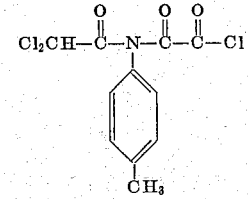

which melts at 112.5–114° C.

Example VIII

Employing the procedure of Example VII but replacing N-dichloroacetyl-p-toluidine with an equimolecular amount of N-chloroacetyl-p-toluidine there is obtained N-chloroacetyl-N-(p-tolyl)oxamic acid chloride

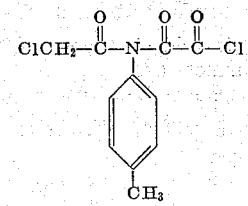

Example IX

Employing the procedure of Example VII but replacing N-dichloroacetyl-p-toluidine with an equimolecular amount of N-dichloroacetyl-3,4-dichloroaniline there is obtained N-dichloroacetyl-N-(3,4-dichlorophenyl)oxamic acid chloride

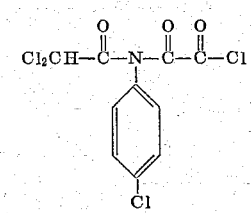

Example X

Employing the procedure of Example VII but replacing N-dichloroacetyl-p-toluidine with an equimolecular amount of N-α-chloropropionyl-p-phenetidine there is obtained N-α-chloropropionyl-N-(p-phenetyl)oxamic acid chloride

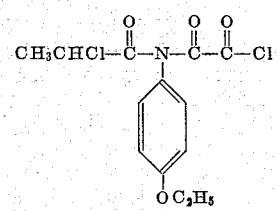

Example XI

Employing the procedure of Example VII but replacing N-dichloroacetyl-p-toluidine with an equimolecular amount of N-chlorofluoroacetyl-3,5-xylidine there is obtained N - chlorofluoroacetyl - N - (3,5 - xylyl)oxamic acid chloride

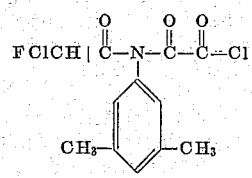

Example XII

Employing the procedure of Example VII but replacing N-dichloroacetyl-p-toluidine with an equimolecular amount of N-dichloroacetyl-2,4,5-trichloroaniline there is obtained N - dichloroacetyl - N - (2,4,5 - trichlorophenyl)oxamic acid chloride

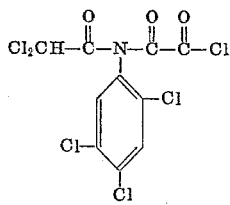

Employing the appropriate amide reactant and oxalyl chloride in accordance with the aforedescribed procedure the following N-(aryl)oxamic acid chlorides are also prepared:

N-(bromoacetyl)oxanilic acid chloride
N-(dibromoacetyl)oxanilic acid chloride
N-(bromochloroacetyl)oxanilic acid chloride
N-(α-bromopropionyl)oxanilic acid chloride
N-(α-chlorobutyryl)oxanilic acid chloride
N-(α-chloro-n-pentanoyl)oxanilic acid chloride
N-chloroacetyl-N-(3-chlorophenyl)oxamic acid chloride
N-chloroacetyl-N-(2,4-dichlorophenyl)oxamic acid chloride
N-chloroacetyl-N-(4-chloro-m-tolyl)oxamic acid chloride
N-chloroacetyl-N-(2-chloro-p-t-butylphenyl)oxamic acid chloride
N-chloroacetyl-N-(o-ethylphenyl)oxamic acid chloride
N-chloroacetyl-N-(3,4-dichlorophenyl)oxamic acid chloride
N-(α-chloropropionyl)-N-(3,4-dichlorophenyl)oxamic acid chloride
N-bromoacetyl-N-(3,4-dichlorophenyl)oxamic acid chloride
N-dibromoacetyl-N-(3,4-dichlorophenyl)oxamic acid chloride
N-bromoacetyl-N-(4-bromophenyl)oxamic acid chloride
N-bromoacetyl-N-(p-anisyl)oxamic acid chloride The N-(aryl)oxamic acid chlorides (I) are useful as preemergent herbicides against a variety of broadleaf plants. For example at a soil application rate of 25 pounds per acre N-(chloroacetyl)oxanilic acid chloride and N-dichloroacetyl-N-(p-tolyl)oxamic acid chloride, respectively, exhibited complete control of the growth of soybean and pigweed seeds.

The N-(aryl)oxamates (II), that is, esters of the formula

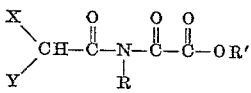

wherein X, Y, R and R' have the aforedescribed significance are useful as contact herbicides against a variety of broadleaf plants. For example methyl N-(chloroacetyl)oxanilate in an aqueous spray at a concentration of 0.2 percent by weight exhibited complete control of growing pigweed, wild buckwheat and tomato plants. These esters can be prepared by reacting to evolve one molecular proportion of hydrogen chloride substantially equimolecular proportions of a N-(aryl)oxamic acid chloride of this invention and an alcohol of the formula R'OH wherein R' has the aforedescribed significance, and as illustrative thereof but not limitative thereof is the following.

*Example VIII*

To a suitable reaction vessel is charged 3.2 parts by weight of methyl alcohol, 26 parts by weight of N-(chloroacetyl)oxanilic acid chloride and 350 parts by weight of methylene chloride. The mass is allowed to stand at room temperature for one hour and then evaporated to dryness at 10–25° C. The residue is recrystallized from carbon tetrachloride to give methyl N-(chloroacetyl)oxanilate

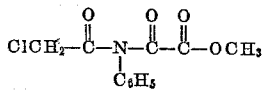

a white solid which melts at 94° C.

*Example XIV*

Employing the procedure of Example XIII but replacing N-(chloroacetyl)oxanilic acid chloride with an equimolecular amount of N-dichloroacetyl-N-(p-tolyl)oxamic acid chloride there is obtained methyl N-dichloroacetyl-N-(p-tolyl)oxamate

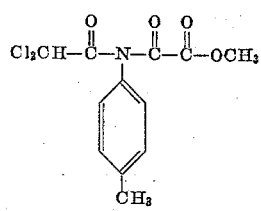

*Example XV*

Employing the procedure of Example XIII but replacing N-(chloroacetyl)oxanilic acid chloride with an equimolecular amount of N-(chloroacetyl)-N-(3,4-dichlorophenyl)oxamic acid chloride there is obtained methyl N-chloroacetyl-N-(3,4-dichlorophenyl)oxamate

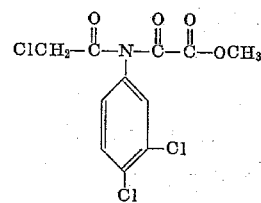

*Example XVI*

Employing the procedure of Example XIII but replacing methyl alcohol with an equimolecular amount of allyl alcohol there is obtained allyl N-(chloroacetyl)oxanilate

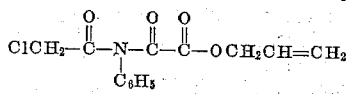

*Example XVII*

Exploying the procedure of Example XIII but replacing methyl alcohol with an equimolecular amount of 2-chloroallyl alcohol there is obtained 2-chloroallyl N-(chloroacetyl)oxanilate.

*Example XVIII*

Employing the procedure of Example XIII but replacing methyl alcohol with an equimolecular amount of 2,3-dichloropropanol there is obtained 2,3-dichloropropyl N-(chloroacetyl)oxanilate.

*Example XIX*

Employing the procedure of Example XIII but replacing methyl alcohol with an equimolecular amount of 2-ethoxyethanol there is obtained 2-ethoxyethyl N-(chloroacetyl)oxanilate.

*Example XX*

Employing the procedure of Example XIII but replacing N-(chloroacetyl)oxanilic acid chloride with an equimolecular amount of N-bromoacetyl-N-(p-anisyl)oxamic acid chloride there is obtained methyl N-bromoacetyl-N-(p-anisyl)oxamate.

*Example XXI*

Employing the procedure of Example XIII but replacing N-(chloroacetyl)oxanilic acid chloride with an equimolecular amount of N-(dichloroacetyl)oxanilic acid chloride there is obtained methyl N-(dichloroactyl)oxanilate.

*Example XXII*

Employing the procedure of Example XIII but replacing N-(chloroacetyl)oxanilic acid chloride with an equimolecular amount of N-chloroacetyl-N-(p-tolyl)oxamic acid chloride there is obtained methyl N-chloroacetyl-N-(p-tolyl)oxamate.

*Example XXIII*

Employing the procedure of Example XIII but replacing N-(chloroacetyl)oxanilic acid chloride with an equimolecular amount of N-chloroacetyl-N-(4-chlorophenyl)oxamic acid chloride there is obtained methyl N-chloroacetyl-N-(4-chlorophenyl)oxamate.

*Example XXIV*

Employing the procedure of Example XIII but replacing methyl alcohol with an equimolecular amount of isoamyl alcohol there is obtained isoamyl N-(chloroacetyl)oxanilate.

*Example XXV*

Employing the procedure of Example XIII but replacing N-(chloracetyl)oxanilic acid chloride with an equimolecular amount of N-dichloroacetyl-N-(3,4-dichlorophenyl)oxamic acid chloride there is obtained methyl N-dichloroacetyl-N-(3,4-dichlorophenyl)oxamate.

*Example XXVI*

Employing the procedure of Example XIII but replacing N-(chloroacetyl)oxanilic acid chloride with an equimolecular amount of N-dichloroacetyl-N-(2,4,5-trichlorophenyl)oxamic acid chloride there is obtained methyl N-dichloroacetyl-N-(2,4,5-trichlorophenyl)oxamate.

*Example XXVII*

Employing the procedure of Example XIII but replacing N-(chloroacetyl)oxanilic acid chloride with an equimolecular amount of N-(chloroacetyl)-N-(4-nitro-m-tolyl)oxamic acid chloride there is obtained methyl N-chloroacetyl-N-(4-nitro-m-tolyl)oxamate.

*Example XXVIII*

Employing the procedure of Example XIII but replacing N-(chloroacetyl)oxanilic acid chloride with an equimolecular amount of N-(α-chloropropionyl)-N-(p-phenetyl)oxamic acid chloride there is obtained methyl N-(α-chloropropionyl)-N-(p-phenetyl)oxamate.

*Example XXIX*

Employing the procedure of Example XIII but replacing N-(chloroacetyl)oxanilic acid chloride with an equimolecular amount of N-(fluorochloroacetyl)-N-(3,5-xylyl)oxamic acid chloride there is obtained methyl N-(fluorochloroacetyl)-N-3,5-xylyl)oxamate.

Other operable alcohols than the aforedescribed useful in preparing the N-(aryl)oxamates include ethanol, propanol, isopropanol, butanol, isobutanol, sec.-butanol, t-butanol, neopentanol, but-2-enol, but-3-enol, pent-3-enol, methallyl alcohol, 2-chloroethanol, 2,2-dichloroethanol, 3-chloropropanol, 4-chlorobutanol, 1,3-dichloropropanol, 2,2,2-trichloroethanol, 4,5-dichloropentanol, 3-chloroallyl alcohol, 3-chlorobut-2-enol, 3-chloro-n-pent-2-enol, and the like which satisfy the formula R'OH wherein R' has the aforedescribed significance. In the instances wherein R' is characterized by chlorine substitution the number of chlorine substituents will be in the range of from 1 to 3. In the matter of reaction temperatures those in the range of 20° C. to 50 C. provide satisfactory results. To increase the rate of reaction an excess of the alcohol reactant can be employed. In general it is preferable to conduct the reaction in the presence of an inert organic liquid such as methylene chloride and like inert liquid materials boiling above room temperature but below 100° C.

The N-(aryl)oxamic acid chlorides (I) when heated above their melting points give up one molecular proportion of hydrogen chloride and cyclize to provide the 3-(aryl)oxazolidine-4,5-diones of the aforedescribed Formula III, i.e.

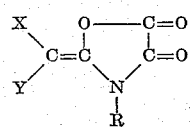

wherein X, Y and R have the aforedescribed significance. These materials are herbicidally active and as illustrative of their preparation is the following:

*Example XXX*

In a suitable reaction vessel 3 parts by weight of N-(chloroacetyl)oxanilic acid chloride is heated at 120° C. for five minutes and then cooled. The residue is then recrystallized from a methylene chloride-hexane mixture to give 2-chloromethylene-3-phenyloxazolidine-4,5-dione $$\text{ClCH=C} \begin{array}{c} \text{O---C=O} \\ | \quad\quad | \\ \text{C=O} \\ \text{\textbackslash N/} \\ | \\ \text{C}_6\text{H}_5 \end{array}$$

a white solid melting at 162–163° C.

*Example XXXI*

In a suitable reaction vessel 3 parts by weight of N-dichloroacetyl-N-(p-tolyl)oxamic acid chloride is heated at 150° C. for one hour and then cooled. The residue is then recrystallized from a methylene chloride-hexane mixture to give 2-dichloromethylene-3-(p-tolyl)oxazolidine-4,5-dione $$\text{Cl}_2\text{C=C} \begin{array}{c} \text{O---C=O} \\ | \quad\quad | \\ \text{C=O} \\ \text{\textbackslash N/} \\ | \\ \text{C}_6\text{H}_4\text{-CH}_3 \end{array}$$

a white solid which melts at 132–133° C.

Employing the appropriate N-(aryl)oxamic acid chloride and heating same at a temperature of about 10° C. to about 50° C. above the melting point thereof for a period of time in the range of about five minutes to about two hours the following 3-(aryl)oxazolidine-4,5-diones are obtained:

2-chloromethylene-3-(4-chlorophenyl)oxazolidine-4,5-dione
2-chloromethylene-3-(p-tolyl)oxazolidine-4,5-dione
2-chloromethylene-3-(4-nitro-m-tolyl)oxazolidine-4,5-dione
2-chloromethylene-3-(3-chloro-4-nitrophenyl)oxazolidine-4,5-dione
2-bromomethylene-3-(p-anisyl)oxazolidine-4,5-dione
2-dichloromethylene-3-(phenyl)oxazolidine-4,5-dione
2-dichloromethylene-3-(3,4-dichlorophenyl)oxazolidine-4,5-dione
2-dichloromethylene-3-(2,4,5-trichlorophenyl)oxazolidine-4,5-dione
2-fluorochloromethylene-3-(3,5-xylyl)oxazolidine-4,5-dione
2-methylchloromethylene-3-(p-phenetyl)oxazolidine-4,5-dione
2-bromomethylene-3-(phenyl)oxazolidine-4,5-dione
2-dibromomethylene-3-(phenyl)oxazolidine-4,5-dione
2-chlorobromomethylene-3-(phenyl)oxazolidine-4,5-dione 2-chloromethylene-3-(3-chlorophenyl)oxazolidine-4,5-dione
2-chloromethylene-3-(2,4-dichlorophenyl)oxazolidine-4,5-dione
2-chloromethylene-3-(4-chloro-m-tolyl)oxazolidine-4,5-dione
2-chloromethylene-3-(2-chloro-p-t-butylphenyl)oxazolidine-4,5-dione
2-chloromethylene-3-(o-ethylphenyl)oxazolidine-4,5-dione
2-ethylchloromethylene-3-(4-chlorophenyl)oxazolidine-4,5-dione
2-bromomethylene-3-(3,4-dichlorophenyl)oxazolidine-4,5-dione
2-bromomethylene-3-(p-tolyl)oxazolidine-4,5-dione
2-n-propylchloromethylene-3(3-chlorophenyl)oxazolidine-4,5-dione
2-n-propylchloromethylene-3-(p-t-butylphenyl)oxazolidine-4,5-dione While this invention has been described with respect to certain embodiments, it is to be understood that it is not so limited and that variations and modifications thereof obvious to those skilled in the art can be made without departing from the spirit and scope thereof.

What is claimed is:
1. An N-(aryl)oxamic acid chloride of the formula

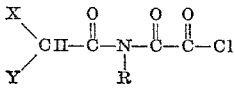

wherein X is halogen of atomic weight in the range of 35 to 80, wherein Y is selected from the group consisting of hydrogen, halogen of atomic weight in the range of 18 to 80 and lower alkyl, and wherein R is an aromatic hydrocarbyl having from 6 to 10 carbon atoms selected from the group consisting of phenyl and alkyl substituted phenyl and said aromatic hydrocarbyl having substituents on the aromatic nucleus thereof selected from the group consisting of halogen of atomic weight in the range of 35 to 80, nitro, methoxy and ethoxy.

2. A N-(aryl)oxamic acid chloride of the formula

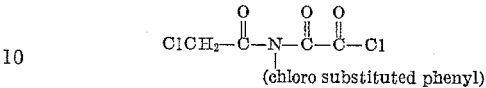

wherein the said chloro substituted phenyl has from 1 to 3 chlorine substituents.

3. N-(chloroacetyl)oxanilic acid chloride.
4. N-(dichloroacetyl)oxanilic acid chloride.
5. N-chloroacetyl-N-(p-tolyl)oxamic acid chloride.
6. N-dichloroacetyl-N-(p-tolyl)oxamic acid chloride.
7. N - chloroacetyl - N - (4-chlorophenyl)oxamic acid chloride.

References Cited by the Examiner

UNITED STATES PATENTS 1,685,698    9/28    Haller _____ 260—544

FOREIGN PATENTS 1,132,912    7/62    Germany.

OTHER REFERENCES

Skinner et al., "J. Am. Chem. Soc.," vol. 72, pp. 5569–5573 (1950).
Stole, "J. Prakt. Chem.," vol. 128 (1930), pp 1–43.

LORRAINE A. WEINBERGER, *Primary Examiner.*

LEON ZITVER, JOSEPH R. LIBERMAN, *Examiners.*